United States Patent [19]
Sommer

[11] 3,722,645
[45] Mar. 27, 1973

[54] CLUTCH UNIT

[75] Inventor: Gordon M. Sommer, Grosse Pointe Woods, Mich.

[73] Assignee: G. M. Sommer Co., Inc., Detroit, Mich.

[22] Filed: Apr. 5, 1971

[21] Appl. No.: 130,947

[52] U.S. Cl..........192/70.13, 192/70.2, 192/85 AA, 192/113 B
[51] Int. Cl......F16d 13/52, F16d 13/72, F16d 13/74
[58] Field of Search...192/70.13, 70.2, 85 AA, 113 B

[56] References Cited

UNITED STATES PATENTS

| | | | |
|---|---|---|---|
| 1,305,029 | 5/1919 | Tibbetts | 192/70.13 |
| 3,251,442 | 5/1966 | Aschauer | 192/85 AA X |
| 2,632,543 | 3/1953 | Wilson | 192/70.13 |
| 2,652,912 | 9/1953 | Bernardo | 192/70.13 |
| 3,099,166 | 7/1963 | Schou | 192/113 B |

*Primary Examiner*—Allan D. Herrmann
*Attorney*—Harness, Dickey & Pierce

[57] ABSTRACT

A clutch unit for selectively drivingly connecting a pair of generally coaxially aligned, axially spaced shafts, the unit comprising an enclosure having spaced side portions through which the shafts project, a pair of generally cylindrically shaped hub elements fixedly secured one to each of the shafts, a clutch assembly adapted to be operatively mounted between the hub elements for selectively drivingly connecting the same; the clutch assembly comprising a generally cylindrically shaped clutch hub, first attachment means securing the clutch hub to a driven ring spaced radially outwardly from clutch hub and arranged generally concentrically thereof, a plurality of torque transmitting discs extending radially between the outer periphery of the clutch hub and the inner periphery of the driven ring, with some of the discs being non-rotatably secured to the clutch hub and other of the discs being non-rotatably secured to the driven ring, an actuating member carried on the clutch hub for biasing the discs into driving relation, and means for axially shifting the driven ring whereby to permit removal of the clutch assembly without requiring movement of the hub elements or the shafts.

32 Claims, 2 Drawing Figures

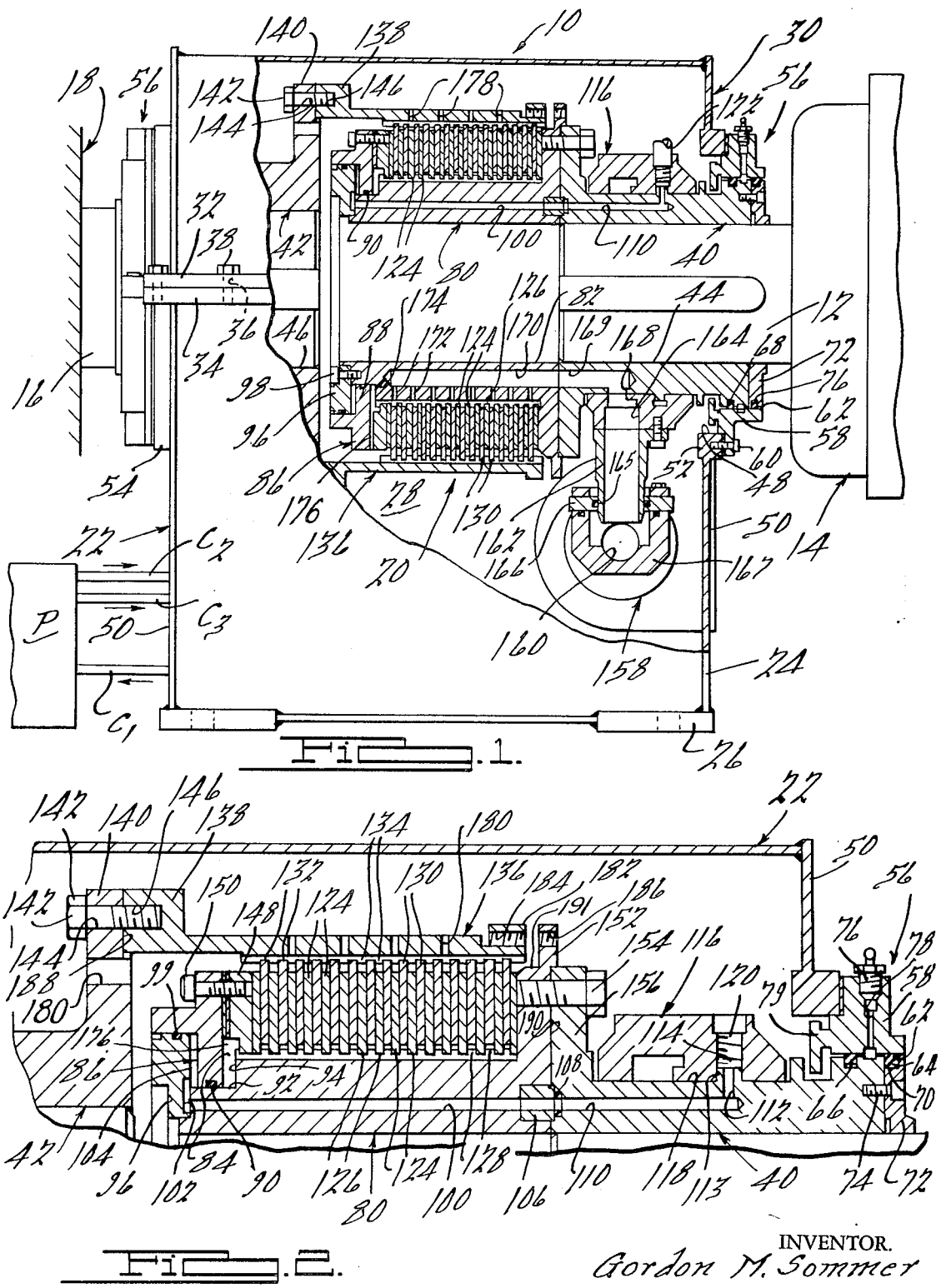

CLUTCH UNIT

SUMMARY OF THE INVENTION

The present invention is generally directed toward clutch units of the type designed for transmitting torque between large horsepower prime movers and associated driven machines. Typically, a clutch unit of the type embodying the present invention might be used for transmitting power between a motor having an output torque of between 500 and 20,000 horsepower, and a driven machine, such as a bail or load mill, centrifugal fan, pump or the like. More particularly, the clutch unit of the present invention is adapted to find universality of application in connection with virtually all types of associated prime movers and associated machines having driving and driven shafts which are to be selectively drivingly connected.

It is accordingly a general object of the present invention to provide a new and improved clutch unit of the above described character.

It is a more particular object of the present invention to provide a new and improved clutch unit wherein the driven torque is transmitted by the shearing of an oil film maintained between the adjacent clutch plates.

It is another object of the present invention to provide a clutch unit which is capable of transmitting large torque loads.

It is a further object of the present invention to provide a new and improved clutch unit having a common oil sump providing actuating fluid for the clutch assembly per se and cooling fluid for the torque transmitting elements thereof.

It is still another object of the present invention to provide a new and improved clutch unit, the capacity of which may be varied by changing the number of clutch discs incorporated therein, and which is equally suitable for use on new installations or for the conversion of prior installations utilizing, for example, dry friction clutches and the like.

It is a further object of the present invention to provide a new and improved clutch unit which may be conveniently installed without requiring machining of the associated driving or driven shafts, and wherein installation and servicing may be accomplished without disturbing the existing associated machinery.

It is still another object of the present invention to provide a new and improved clutch unit of the above described type wherein the main housing thereof may be used as an oil sump in applications having relatively low thermal requirements, or which may be used with an auxiliary heat transfer arrangement when energy requirements dictate high cooling oil flow rates.

It is another object of the present invention to provide a new and improved clutch unit that will find universality of application, is of a relatively simple design, is economical to manufacture, is of a durable construction, and which will therefore have a long and effective operational life.

Other objects and advantages of the present invention will become apparent from the following detailed description taken in conjunction with the accompanying drawing.

BRIEF DESCRIPTION OF THE DRAWING

FIG. 1 is a longitudinal cross-sectional view of the clutch unit of the present invention, and FIG. 2 is an enlarged fragmentary view of the portion of the clutch assembly of the clutch unit embodying the principles of the present invention.

DETAILED DESCRIPTION OF A PREFERRED EMBODIMENT

Referring now in detail to the drawing and in particular to FIG. 1, a clutch unit 10, in accordance with an exemplary embodiment of the present invention, is shown in operative association with a driving shaft 12 of an associated source of motive power, such as a motor 14, and a driven shaft 16 of an associated work performing apparatus, representatively designated by the numeral 18. As will hereinafter be described in detail, the clutch unit 10 is adapted to be selectively actuated to drivingly connect the shafts 12 and 16 so that the motor 14 is operable to impart rotation to the shaft 16 and thus effect operation of the apparatus 10.

Generally speaking, the clutch unit 10 comprises a clutch assembly 20 which is located interiorly of a housing 22 that serves the two-fold function of protecting the clutch assembly 20 from the elements and of providing a fluid reservoir for actuating and cooling fluid utilized by the assembly 20 during operation thereof, as will later be described. The housing 22 comprises a generally rectangular shaped lower or base section 24 which is provided with means representatively designated at 26 for securing the same upon a suitable support structure, such as upon the floor or the like. The lower housing section 24 defines an internal volume or chamber 28 which is adapted to be supplied with a suitable quantity of hydraulic fluid for use by the clutch assembly 20, which fluid is adapted to serve both a cooling function and an actuating function in a manner later to be described. The housing 22, together with the lower housing section 24, comprises an upper housing section 30 which is provided with a lower peripheral enlarged thickness flange portion 32 adapted to bear upon and be secured to a similar upper peripheral flange portion 34 formed around the upper edge of the lower housing section 24. The flange portions 32, 34 are preferably provided with suitable aligned apertures 36 through which suitable securing bolts or other fastening elements 38 may extend for fixedly securing the upper and lower housing sections 30 and 24, respectively. It will be appreciated, of course, that the flange portions 32, 34 preferably provide a fluid tight seal to prevent fluid leakage, and that the upper housing section 30, upon suitable removal of the bolts 38, may be lifted upwardly or elevated to provide access to the clutch assembly 20.

The clutch assembly 20 is adapted to be interposed between and drivingly connect a driving hub 40 and a driven hub 42 which are of a generally hollow cylindrical configuration and adapted to be associated with the driving shaft 12 and driven shaft 16, respectively. More particularly, the driving hub 40 is formed with a central longitudinally extending bore 44 adapted to nestingly receive the outer end of the driving shaft 12 of the motor 14, the hub 40 being non-rotatably secured to the shaft 12 by any suitable means, such as a keyway or the like well known in the art. In a similar manner, the driven hub 42 is formed with a central annular bore 46 adapted to nestingly receive and be non-rotatably secured to the driven shaft 16 of the apparatus 18, as best illustrated in FIG. 1. A pair of axially aligned openings 48 are formed in the opposite ends or sides 50 of the housing 22 at positions aligned with the shafts 12 and 16, whereby the driving and driven hubs 40 and 42, respectively, may extend axially outwardly from the opposite sides of the clutch unit 10. The peripheries of the openings 48 are formed with integral, enlarged thickness portions 52 and 54, respectively, which are cooperable with a pair of fluid seal assemblies, generally designated by the numeral 56, one of which is shown in detail in operative association with the portion 52. The seal assembly 56 associated with the portion 54 is preferably of a similar construction and operation so that a detailed description thereof need not be presented herein.

The fluid seal assembly 56 depicted herein comprises a fixed annular ring 58 which is adapted to be non-rotatably secured by means of suitable screws, bolts or the like 60 to the portion 52. The ring 58 defines an annular, axially extending surface 62 arranged generally coaxially of the axis of rotation of the shaft 12 and adapted to be engaged by a pair of annular, axially spaced ring elements 64 and 66, the latter of which is carried within suitable annular groove or recess 68 formed around the outer periphery of the outer axial end of the driving hub 40. The other sealing element 64 is carried within a suitable annular recess or groove 70 of a generally ring-shaped retaining member 72 that is fixedly secured to the axially outer end of the driving hub 40 by means of a plurality of circumferentially spaced, axially extending screws, bolts or the like 74. The annular ring 58 is provided with a suitable lubrication fitting 76 which is communicable via a suitable radially extending passage 78 in the ring 58 with an annulus defined by the interface between the sealing surface 62 and the outer periphery of the axially outer end of the driving hub 40, as illustrated, which annulus is intended to be filled with grease in order to provide a dirt trap to prevent the ingress of dirt, moisture, or other foreign material into the interior of the housing 22. As will be appreciated by those skilled in the art, the sealing element 66 and a generally radially disposed baffle or labyrinth element 79 formed integrally of the ring 58 are adapted to prevent the egress of actuating and cooling oil from the interior of the housing 22 through either of the openings 48 at the opposite sides of the housing 22. Toward this end, it will be noted that the sealing elements 64, 66 are maintained under a state of compression and are thus contiguously engaged with the surface 62 of the ring 58 and are slidably received within the annular grooves 68, 70, whereby to provide for relative rotational movement between the ring 58 and driving hub 40. If desired, a suitable drain port (not shown) may be provided adjacent the outer side of the labyrinth element 79 to permit fluid to drain back toward the reservoir in the lower end of the housing 22.

The clutch assembly 20 comprises a generally cylindrically shaped clutch hub 80 which is piloted or positioned in a manner later to be described between and aligned with the driving hub 40 and driven hub 42, as best seen in FIG. 1. The clutch hub 80 may, if desired, be formed with a central annular bore 82, and the axial end of the hub 80 confronting the axially outer end of the driven hub 42 is formed with a reduced thickness recessed area 84 which carries an annular, axially slidable piston 86. As best seen in FIG. 2, the cylinder 86 comprises a generally radially disposed guide portion 88, the radially innermost part of which carries an annular sealing element 90 adapted to sealingly engage a generally axially extending annular surface 92 defined in the recessed area 84. Together with the surface 92, the recessed area 84 defines a generally radially outwardly extending surface or shoulder 94 which is cooperable with an annular, retaining ring 96 fixedly secured to the adjacent axially outer end of the clutch hub 80 by suitable screws, bolts or the like 98, in defining the axially limits of sliding movement of the piston 86 with respect to the clutch hub 80. That is, in operation of the clutch unit 10 of the present invention, the piston 86 is free to move axially toward the left in the drawing to a position engaged with the ring 96 and is adapted to move axially toward the right in the drawing to a position engaged with the radial shoulder 94. The radially outermost side of the ring 96 is provided with a suitable sealing element 99 which cooperates with the aforedescribed element 90 in providing a fluid tight seal around the outer periphery of the piston 86.

The clutch hub 80 is formed with one or more axially extending bores or fluid passages 100, one end of each of which is communicable with a recessed area 102 formed on one axial side of the ring 96, the recessed area 102 being communicable with a volume or chamber 104 defined between the ring 96 and the piston 86. The opposite end of each of the fluid passages 100 is communicable via a suitable fluid fitting 106 and sealing element 108 with an axially aligned fluid passage 110 formed in the driving hub 40. Each of the passages 110 is in turn communicable with a radial passage 112 formed in radially outwardly extending shoulder 113. Each of the passages 112 is communicable with an annular recess 114 within which the shoulder 113 is nested, the recess 114 being formed in an annular non-rotatable oil seal ring 116 which is carried upon a generally cylindrical surface 118 of the driving hub 40. The oil seal ring 116 is provided with suitable fluid fitting means 120 that is communicable with the recess 114 and is adapted to be connected to a suitable fluid conduit 122 which is in turn communicable with a source of pressurized fluid, such as a pump or the like, hereinafter to be described, which functions to pump fluid through the conduit 122, bore 114 passages 112, 110, fitting 106 comma and passages 100 to the volume 104, whereby to cause the piston 86 to move toward the right in the drawing, as will be described in connection with the overall operation of the clutch unit 10 of the present invention.

The clutch assembly 20 is provided with a plurality of generally ring shaped clutch discs, generally designated by the numeral 124. The discs 124 are axially spaced along the outer periphery of the clutch hub 80, and the inner periphery of each of the discs 124 is provided with a splined formation 126, whereby the discs 124 are adapted for splined engagement with a complementary shaped splined formation 128 formed around the outer periphery of the clutch hub 80, with the result that the discs 124 are non-rotatably and axially slidably secured to the clutch hub 80. Alternatively arranged with respect to the plurality of discs 124 is a plurality of driven discs 130 that are similar in construction to the clutch discs 124 and which are formed with a splined formation 132 around the outer periphery thereof. The formation 132 around the outer periphery of each of the driven discs 130 is adapted for splined engagement with a complementary splined formation 134 formed around the inner periphery of a generally cylindrically shaped driven ring 136 which extends around the outer periphery of the discs 124 and 130, the ring 136 extending substantially axially the entire length of the clutch assembly 20 between the axially confronting ends of the driving hub 40 and the driven hub 42. It will be seen that the axial end of the driven ring 136 adjacent the driven hub 42 is formed with a radially outwardly extending shoulder portion 138 which is adapted for attachment to a radially outwardly extending flange 140 formed on the adjacent end of the driven hub 42, the shoulder portion 138 and flange 140 preferably being secured by means of a plurality of circumferentially spaced, axially extending screws, bolts or the like 142 projecting through suitable aligned bores 144 and 146 in the flange 140 and shoulder portion 138, respectively, as best seen in FIG. 2.

In a preferred construction of the present invention, the plurality of clutch discs 124 are fabricated with a steel core upon which bronze facings have been sintered. The faces are preferably, although not necessarily, formed with suitable groovings which produce lands that are in the shape of small parallelograms which act similar to minute hydro-dynamic bearings in the presence of controlled oil flow and function to maintain a thin, but positive oil film between the confronting faces of the clutch discs 124 and associated driven discs 130, and it is the shearing of this oil film which transmit torque between the clutch discs 124 and driven discs 130, and hence between the driving shaft 12 and driven shaft 16 during operation of the clutch unit 10.

The piston 86 is provided with a generally flat, radially extending, ring shaped pressure plate 148 which is secured to the side thereof confronting the discs 124, 130 by means of a plurality of suitable screws, bolts or the like 150. The pressure plate 148 is cooperable with an annular ring section 152 which is formed integrally of one end of the clutch hub 80 and is secured by means of suitable screws, bolts or the like 154 to a radially outwardly extending flange 156 formed on the axially outer end of the driving hub 40. It will be seen that at such time as a fluid pressure is increased a predetermined amount within the volume or chamber 104, the piston 86 will move toward the right in the drawing, thereby compressing the plurality of discs 124, 130 between the pressure plate 148 and ring 152 to effect actuation of the clutch unit 10.

In order to provide the desired cooling of the clutch assembly 20, cooling fluid or oil is adapted to be communicated from the interior of the chamber 28 to the assembly 20 by means of s suitable fluid or oil manifold assembly 158. Toward this end, the clutch unit 10 is provided with a fluid pumping mechanism, schematically illustrated in FIG. 1 and generally designated by the letter P. The pumping mechanism P is adapted to be communicable with the interior of the chamber 28 via a suitable conduit $C_1$, through which fluid is pumped from the chamber 28 to the mechanism P, which fluid is communicated back to the aforementioned conduit 122 by means of a return conduit $C_2$ and to the manifold assembly 158 through a suitable return conduit $C_3$. The assembly 158 comprises a suitable inlet conduit 160 communicable with the conduit $C_3$, the conduit 160 being communicable with a suitable conduit 162 which is in turn communicable with a fluid passage 164 formed in the relatively non-rotatable oil seal ring 116. It will be noted that the conduit 162 is slidably received within an annular bore 165 of a slide block member 166 of the manifold assembly 158, and that the slide block member 166 is in turn axially or longitudinally slidable relative to a relatively fixed manifold member 167. With this arrangement, the conduit 162 is free to move radially with respect to the assembly 158 in the event of any radial runout (movement) of the driving shaft 12, whereas the sliding block 166 is adapted to move axially with respect to the manifold member 167 in the event there is any relative axial movement of the driving shaft 12, as will occasionally occur in connection with the output shafts of large capacity of large horsepower prime movers. It will be appreciated, of course, that the splined connection between the plurality of discs 124, 130 and the clutch hub 80 and driven ring 136 accommodates for the aforesaid axial movement of either of the shafts 12 or 16 without interfering with the operation of the clutch unit 10 of the present invention.

The passage 164 is communicable with an annular recess or passage 168 formed in the outer periphery of the driving hub 40, which passage 168 is adapted for fluid communication with one or more axially extending bores 169 in the driving hub 40. Each of the bores 169 is communicable with an axially aligned fluid passage 170 formed in the clutch hub 80, which passage 170 is in turn communicable with a plurality of radially outwardly extending orifices 172 which function to communicate cooling fluid to the radially innermost portions of a plurality of discs 124, 130. The fluid passage 170 is also communicable via a radially and axially outwardly extending orifice 174 with an area 176 defined between the piston 86 and the radial surface 94 on the adjacent end of the clutch hub 80. Fluid communication is also provided between the interior of the clutch assembly 20 and the interior of the housing 22 through a plurality of radially disposed orifices 178 formed in the driven ring 136 and through suitable orifice means 180 formed in the flange 140 of the driven hub 42, whereby to provide for complete and efficient fluid transmission to obtain optimum cooling of the clutch assembly 20.

A particular feature of the present invention resides in the fact that the clutch assembly 20 may be initially installed and subsequently removed for purposes of inspection or servicing without requiring any drilling of the shaft 12 or driven shaft 16, and without requiring moving of the motor 14 or work performing apparatus 18. Thus, complete servicing can be performed without disturbing the associated machinery. The aforesaid is accomplished through the provision of a generally radially outwardly extending flange portion 182 formed on the outer periphery of the driven ring 136 at the end thereof adjacent the driving hub 40. The flange portion 182 is formed with a series of axially extending internally threaded bores 184 which are circumferentially and axially aligned with a cooperable series of bores 186 formed around the outer periphery of the ring section 152. It will be seen that in the normal operating configuration of the clutch assembly 20, the shoulder portion 138 of the driven ring 136 is nestingly received within an annular shoulder 188 formed around the confronting side of the flange 140 of the driven hub 42, the shoulder 188 being of substantially the same diameter as the inner diameter of the driven ring 136, as illustrated. At such time as it is desired to remove the clutch assembly 20 from within the unit 10, the upper section 30 of the housing 22 is initially removed. Thereafter, a plurality of screws, bolts or the like (not shown) are inserted through the bores 186 and threaded into the bores 184, after which time the plurality of bolts 142 normally securing the driven ring 136 to the driven hub 42 are removed. The aforesaid screws or bolts which have been threaded into the bores 184 are then threadably advanced, whereby to axially draw or bias the driven ring 136 toward the right in the drawing. As this occurs, the left end of the driven ring 136 is drawn off from the shoulder 188, and the right end thereof is biased onto a generally radially disposed shoulder 191 that is of substantially the same diameter as the inner diameter of the driven ring 136 and is formed on the ring section 152 which, as described above, is secured to the driving hub 40. After the driven ring 136 has thus been translated from the driven hub 42 onto the driving hub 40, a suitable sling or the like may be placed around the outer periphery of the driven ring 136 and connected to a suitable elevated hoist or the like. At such time as said hoist is properly tensioned, the plurality of bolts 154 may be removed, at which time the entire clutch assembly 20 is free to be elevated upwardly or otherwise removed from between the driving hub 40 and driven hub 42. It may be noted that suitable means in the form of screws, bolts or the like may be threaded into tapped holes provided in the driving hub 40 for breaking the pilot fit between the clutch assembly 20 and the driving hub 40, as will be appreciated by those skilled in the art. Of course, the replacement or reinsertion of the clutch assembly 20 into the operative position illustrated in the drawing may be conveniently accomplished by reversing the aforedescribed operation.

It will be seen from the foregoing that the present invention provides a novel clutch unit which will find universality of application in virtually all types of torque transmitting installations, and that the torque transmitting capacity thereof may be conveniently adapted to various applications merely be changing the number of discs 124 and 130. Another particularly important feature of the present invention, as described above, resides in the convenient installation and removal of the clutch assembly 20 which may be accomplished without disturbing existing machinery and without requiring any machining, i.e., drilling or the like, of the existing driving and driven shafts. Additionally, it will be appreciated that the clutch unit of the present invention may be in the form of a simple unitized package which is self-contained in all respects, including the fluid reservoir for cooling and actuating fluids. It will be noted, of course, that an auxiliary heat transfer device may be operatively associated with the clutch unit of the present invention and may be located at any convenient adjacent or remote location where energy requirements so dictate.

While it will be apparent that the preferred embodiment illustrated herein is well calculated to fulfill the objects above stated, it will be appreciated that the present invention is susceptible to modification, variation and change without departing from the scope of the invention.

I claim:

1. In a clutch unit for selectively drivingly connecting spaced, generally coaxially arranged rotatably driving and driven elements, a first generally cylindrical hub member adapted to be fixedly secured to and be rotatable with one of said elements, a second generally cylindrical hub member spaced axially away from said first hub member and adapted to be fixedly secured to and be rotatable with the other of said elements, a clutch assembly adapted to be interposed between said hub members, said clutch assembly comprising, a clutch hub member arranged generally coaxially of said elements and fixedly secured to one of said first mentioned hub members, said clutch hub member having a first plurality of friction discs non-rotatably secured thereto, a driven ring member arranged concentrically of and spaced radially outwardly from said clutch hub member, said driven ring member being fixedly secured to the other of said first mentioned hub members and having a second plurality of friction discs non-rotatably secured thereto, said first and second pluralities of friction discs being axially movable to drivingly connect said clutch hub member and said driven ring member, actuating means movable axially of said assembly for selectively axially moving said friction discs including means providing a source of fluid for operating said actuating means and for providing fluid circulation between and around said friction discs to minimize wear and effect cooling thereof, and means for removing said clutch assembly as a unit including said clutch hub member and ring member from its normal operative position interjacent said first and second hub members without requiring displacement of said first and second hub members or said driving and driven elements.

2. A clutch unit as set forth in claim 1 which includes means providing a common source of fluid for operating said actuating means and for providing said fluid for circulation between and around the said friction discs.

3. A clutch unit as set forth in claim 1 wherein said first and second pluralities of friction discs are alternatively disposed axially of said clutch hub member.

4. A clutch unit as set forth in claim 1 wherein said clutch hub member is fixedly secured to said first hub member and said driven ring member is fixedly secured to said second hub member.

5. A clutch unit as set forth in claim 1 which includes a housing substantially enclosing said clutch assembly and providing a fluid reservoir.

6. A clutch unit as set forth in claim 5 which includes means preventing fluid egress between the outer periphery of said first and second hub members and said enclosure.

7. A clutch unit as set forth in claim 1 wherein said actuating means is carried on said clutch hub member and is movable axially thereof in response to preselected application of fluid pressure thereto.

8. A clutch unit as set forth in claim 1 which includes means providing fluid passages extending axially of said clutch assembly for communicating actuating fluid to said actuating means and cooling fluid to said friction discs.

9. A clutch unit as set forth in claim 8 which includes first and second axially extending fluid passages formed in said clutch hub member, which includes an oil seal ring carried on one of said hub members and communicable with said passages, and means communicating actuating and cooling fluid from said source thereof to said oil seal ring.

10. A clutch unit as set forth in claim 1 which includes means providing formations on said friction discs, said clutch hub and said driven ring for non-rotatably securing said first plurality of friction discs to said clutch hub and said second plurality of friction discs to said driven ring.

11. In a clutch unit for selectively drivingly connecting a pair of generally coaxially arranged, axially spaced apart shafts, a pair of generally cylindrically shaped hub elements adapted to be fixedly secured one on each of the shafts, said hub elements comprising axially spaced confronting end portions, a clutch assembly adapted to be operatively mounted between said end portions for drivingly connecting said hub elements, said clutch assembly comprising, a first generally cylindrical member fixedly secured at one end thereof to one of said end portions, a second generally cylindrical member arranged concentrically of said first member and fixedly secured at one end thereof to the other of said end portions, a plurality of friction discs extending radially between said cylindrical members, with some of said discs being non-rotatably secured to one of said members and other of said discs being non-rotatably secured to the other of said members, and actuating means for selectively biasing said discs into driving relation with one another, means defining a pair of axially spaced shoulders on said hub elements for cooperatively receiving opposite axial ends of said second cylindrical member, and means for selectively securing said second cylindrical member to one of said hub elements during normal operation of said clutch assembly and to the other of said hub elements to permit said assembly to be withdrawn from said clutch unit, at least one of said members being axially movable relative to said hub elements to permit said assembly to be withdrawn from between said hub elements without necessitating movement of said hub elements and said shafts.

12. A clutch unit as set forth in claim 11 which includes first attachment means securing one end of said second cylindrical member to one of said hub elements and second attachment means adapted to secure the opposite end of said second cylindrical member to the other of said hub elements.

13. A clutch unit as set forth in claim 11 wherein said actuating means comprises an annular, axially movable member carried on said first cylindrical member.

14. A clutch unit as set forth in claim 11 which includes means providing fluid passages extending axially of said clutch assembly for communicating actuating fluid to said actuating means and cooling fluid to said friction discs.

15. A clutch unit as set forth in claim 11 which includes means providing formations on said friction discs, and said first and second cylindrical members for non-rotatably securing said first plurality of friction discs to said members.

16. A clutch unit as set forth in claim 15 which includes first and second axially extending fluid passages formed in one of said cylindrical members, which includes an oil seal ring carried on one of said hub elements and communicable with said passages, and means communicating actuating and cooling fluid from said source thereof to said oil seal ring.

17. A clutch unit for selectively drivingly connecting a pair of generally coaxially aligned, axially spaced shafts,
said unit comprising an enclosure having spaced side portions through which the shafts project,
a pair of generally cylindrically shaped hub elements fixedly secured one to each of said shafts,
means preventing fluid egress between said hub elements and said enclosure,
said hub elements comprising axially spaced confronting end portions,
a clutch assembly adapted to be operatively mounted between said end portions for selectively drivingly connecting said hub elements,
said clutch assembly comprising,
a generally cylindrically shaped clutch hub,
means defining a first generally radially disposed shoulder extending around the outer periphery of said clutch hub,
first attachment means securing said last mentioned means and said clutch hub to said end portion of one of said hub elements,
a driven ring spaced radially outwardly from said clutch hub and arranged generally concentrically thereof,
means defining a second generally axially extending shoulder on said end portion of the other of said hub elements and adapted for engagement with one end of said driven ring,
second attachment means for securing said one end of said driven ring to said other hub element,
a plurality of torque transmitting discs extending radially between the outer periphery of said clutch hub and the inner periphery of said driven ring, with some of said discs being non-rotatably secured to said clutch hub and other of said discs being non-rotatably secured to said driven ring,
an actuating member for biasing said discs into driving relation, and
means for axially shifting said driven ring between a first position wherein said one end thereof is engaged with said second shoulder, and a second position wherein the opposite end of said driven ring is engaged with said first shoulder, whereby to permit removal of said clutch assembly without requiring movement of said hub elements and said shafts.

18. A clutch unit as set forth in claim 17 wherein said enclosure includes means providing a fluid reservoir.

19. A clutch unit as set forth in claim 17 wherein a portion of said enclosure is removable to permit removal of said clutch assembly from said unit.

20. A clutch unit as set forth in claim 17 which includes means defining at least one axially extending aperture on said driven ring, and which includes attachment means extending between the adjacent of said hub elements and said aperture for securing said driven ring thereto.

21. A clutch unit as set forth in claim 17 which includes means providing fluid passages extending axially of said clutch assembly for communicating actuating fluid to said actuating member and cooling fluid to said friction discs.

22. A clutch unit as set forth in claim 21 which includes first and second axially extending fluid passages formed in said clutch hub, which includes an oil seal ring carried on one of said hub elements and communicable with said passages, and means communicating actuating and cooling fluid from said source thereof to said oil seal ring.

23. A clutch unit as set forth in claim 17 which includes means providing formations on said friction discs, said clutch hub and said driven ring for non-rotatably securing a first plurality of friction discs to said clutch hub and a second plurality of friction discs to said driven ring.

24. A clutch unit as set forth in claim 23 wherein said plurality of friction discs are splined to said clutch hub and said driven ring.

25. A clutch unit as set forth in claim 17 wherein said actuating member is axially slidably carried upon said clutch hub and is actuatable in response to preselected fluid pressure applied thereto.

26. A clutch unit as set forth in claim 17 wherein the diameter of said first and second shoulders are approximately equal.

27. A clutch unit as set forth in claim 26 wherein the inner diameter of said driven ring is approximately equal to the diameter of said shoulders.

28. A clutch unit as set forth in claim 22 which includes a plurality of fluid flow orifices communicating fluid from one of said axial passages to said friction discs for communicating fluid thereto.

29. In a clutch unit for selectively drivingly connecting spaced, generally coaxially arranged rotatably driving and driven elements, a housing defining a fluid reservoir, a first generally cylindrical hub member at least partially located in said reservoir adapted to be fixedly secured to and be rotatable with one of said elements, a second generally cylindrical hub member adapted to be fixedly secured to and be rotatable with the other of said elements and spaced axially away from said first hub member, said second hub member also at least partially located in said reservoir; clutch means located in said reservoir for drivingly connecting said first and second hub members; actuating means associated with said clutch means for selectively drivingly engaging and disengaging said driving and driven elements; and fluid passage means for introducing a fluid media to said clutch means, said passage means including a stationary seal ring supported by one of said hub members, manifold means immovably supported by said housing for receiving said fluid media; and fluid conduit means having opposite ends in fluid communication with said seal ring and said manifold means, said conduit means being fixedly connected to one of said ring and manifold means and movably connected relative to the other whereby to compensate for misalignment between said driving and driven elements.

30. The clutch unit as set forth in claim 29 wherein said manifold means includes a first member adapted to be connected to a source of said fluid media, a second member having a bore in fluid communication with said first member and slidably connected thereto, and wherein said conduit means is slidably located in said bore whereby said conduit means is free to move radially relative to said elements to compensate for radial misalignment and said second member is slidable axially to compensate for axial misalignment.

31. The clutch unit as set forth in claim 29 wherein said manifold means provides a common source of fluid media for operating said actuating means and for providing said fluid media for circulation between and around said clutch means.

32. The clutch unit as set forth in claim 29 wherein said actuating means is carried on said clutch means and is movable axially thereof in response to preselected application of pressurized fluid media.

* * * * *